(12) United States Patent
Lusk et al.

(10) Patent No.: US 8,066,321 B2
(45) Date of Patent: Nov. 29, 2011

(54) STRUCTURAL SHEAR PLATE FOR A VEHICLE

(76) Inventors: Kevin Lusk, Gimli (CA); William H. Stanton, Winnipeg (CA)

( * ) Notice: Subject to any disclaimer, the term of this patent is extended or adjusted under 35 U.S.C. 154(b) by 1125 days.

(21) Appl. No.: 11/847,411

(22) Filed: Aug. 30, 2007

(65) Prior Publication Data

US 2008/0044630 A1 Feb. 21, 2008

Related U.S. Application Data (63) Continuation-in-part of application No. 11/782,083, filed on Jul. 24, 2007, now Pat. No. 7,862,101, which is a continuation-in-part of application No. PCT/CA2006/001534, filed on Sep. 20, 2006.

(60) Provisional application No. 60/738,032, filed on Nov. 21, 2005, provisional application No. 60/841,498, filed on Sep. 1, 2006.

(51) Int. Cl.
*B60J 7/00* (2006.01)
(52) U.S. Cl. .................. 296/178; 296/210; 296/193.06; 296/193.07; 296/203.03; 296/29
(58) Field of Classification Search ............ 296/193.07, 296/184.1, 187.08, 178
See application file for complete search history.

(56) References Cited

U.S. PATENT DOCUMENTS

| | | | |
|---|---|---|---|
| 5,042,395 A | 8/1991 | Wackerle | |
| 5,140,913 A | 8/1992 | Takeichi | |
| 5,433,151 A | 7/1995 | Ohara | |
| 5,904,972 A | 5/1999 | Tunis | |
| 5,918,548 A | 7/1999 | Elsner | |
| 6,237,989 B1 | 5/2001 | Ammerlaan | |
| 6,375,249 B1 * | 4/2002 | Stanton et al. | 296/178 |
| 6,685,254 B2 | 2/2004 | Emmons | |

FOREIGN PATENT DOCUMENTS

| | | |
|---|---|---|
| DE | 19806484 | 8/1999 |
| EP | 0063214 | 10/1982 |
| EP | 0439432 | 7/1991 |
| EP | 0622285 | 11/1994 |
| EP | 1115606 | 7/2001 |
| WO | WO/2004/000633 | 12/2003 |
| WO | WO/2004/000634 | 12/2003 |

* cited by examiner

*Primary Examiner* — Joseph Pape
(74) *Attorney, Agent, or Firm* — Adrian D. Battison; Ade & Company Inc (57) ABSTRACT

A structural shear panel for forming a floor panel for support by a vehicle frame is formed by a composite of top and bottom sheets and a core with a vacuum infused resin. The panel is mainly planar and terminates at its side edges at a portion which lies in a common plane and portions are provided which are deformed out of the generally planar shape to form depending or elevated sections. The structure is formed on a generally flat plate defining the planar panel portion with removable sections to define the depending and elevated sections. Edge pieces are attached to the plate to define the edges of the panel. Accessories are attached to the panel without compressing the core by a base plate of the accessory which is bolted to a bracket which has a backer plate and collar through a hole in the panel.

9 Claims, 8 Drawing Sheets

STRUCTURAL SHEAR PLATE FOR A VEHICLE

This application is a continuation-in-part of U.S. application Ser. No. 11/782,083, filed Jul. 24, 2007 which is a continuation-in-part of PCT Application PCT/CA2006/001534, filed Sep. 20, 2006.

This application claims the benefit under 35 U.S.C. 119 of Provisional Application 60/738,032, filed Nov. 21, 2005.

This application claims the benefit under 35 U.S.C. 119 of Provisional Application 60/841,498, filed Sep. 1, 2006.

This invention relates to a structural shear plate to be used for example in a vehicle, to a method of manufacturing such a shear plate and to an arrangement for attachment of an accessory to the shear plate.

BACKGROUND OF THE INVENTION

There has been an intention in the industry of mass transit vehicles to provide a vehicle body which is formed primarily of a composite material. Such composite materials generally comprise fibreglass reinforced resin sheets and often these are formed with a foam or other core layer between the sheets. The primary intention is that the structure be formed substantially wholly from such composite materials. The intention is that such materials will reduce weight and provide a superior corrosion resistance. One technique is to provide molds in which the body is shaped and formed from separate pieces which can then be connected together. However one highly desirable feature is that the structure can provide multiple different vehicle lengths to satisfy customer demands.

A number of attempts have been made for example, by Grumman ATTB, NABI who provided 40 and 45 feet length "Compobus", a proposal by ABI, a proposal by TPI under the trade name "Airporter", a proposal by Den Oudsten Bussen/Fokker Stork. However these proposals have been put forward in a manner that does not fully address one or more of the critical market entry or performance criteria resulting in a vehicle that has limited appeal or cannot meet the rigorous performance standards dictated by the transit agencies. In Europe, where road maintenance is superior relative to North America and durability is less of a concern, there has been little interest in lightweight composite vehicles, Den Oudsten Bussen created the RET X-98 which was to enter revenue service in Rotterdam, but aside from stirring momentary interest at a few shows, the modular vehicle could not save the company from bankruptcy. The Fokker-Stork body technology was licensed to APT Systems in Helmond NL which was incorporated into the Phileas, which has achieved little success. The license for the Fokker Stork body technology is held in North America by New Flyer but this again has achieved no commercial success.

One of the defining criteria is vehicle length. The market requires vehicles under 29 feet in length, 30 to 35 feet and 40 feet and 45 feet commuter buses together with 60 feet articulated vehicles. All previous attempts can be divided into two categories: one set of molds for each body length or various body lengths created by ganging modules. The multiple mold strategy of course provides a huge tooling expense. The multiple module technique has inherent weaknesses.

Up till now, therefore, no commercial vehicle of this type has been successfully exploited.

It will be appreciated that vehicles of this type can be used either as a light rail vehicle or as a road vehicle and many common features can be used in both structures. There are of course significant differences which will be well known to one skilled in the art but the principle set forth in the present application can in most cases be used in both fields.

A number of prior patents have been published showing features of the above mentioned commercial attempts and showing various other arrangements by other parties interested in this field.

The following patents have been noted as having some relevance in the present field U.S. Pat. No. 5,042,395 (Wackerle) issued Aug. 27, 1991. Wackerle discloses a rail vehicle formed from molded upper section defining the side walls and roof connected to a floor section. The connection is provided by a corner piece which is bonded into an edge piece at each edge of each molded composite panel. The composite panels are formed from exterior sheets with a honey comb core between.

U.S. Pat. No. 5,140,913 (Takeichi) issued Aug. 25, 1992. Takeichi discloses a rail vehicle which is similarly constructed to the above except that it is formed in sections which are connected edge to edge along the length of the vehicle. The floor sections are formed from side beams and horizontal rails.

U.S. Pat. No. 6,433,151 (Ohara) issued Jul. 18, 1995 discloses a similar arrangement.

U.S. Pat. No. 5,904,972 (Tunis) issued May 18, 1999 discloses a technique for forming large composite core structures by vacuum assisted resin transfer molding. This is not particularly directed to vehicles but provides a technique which can form the large molded sections.

U.S. Pat. No. 5,918,548 (Elsner) issued Jul. 6, 1999 discloses a rail vehicle formed by connected beams.

U.S. Pat. No. 6,237,989 (Ammerlaan) issued May 29, 2001 discloses the arrangement of the Fokker Stork device described above which is defined as a molded structure formed by connected side panels, roof and floor sections where the drive components for the vehicle are bolted under the floor sections.

U.S. Pat. No. 6,686,254 (Emmons) issued Feb. 3, 2004 discloses a vehicle which is primarily formed from a roof section and a floor section together with vertical beams where the roof and floor sections are formed as a sandwich panel defined by the fibre reinforced sheets and an interconnecting core.

PCT Publication No. WO/2004/000633 and 000634 assigned to NABI published 31 Dec. 2003 discloses a molded structure in which the body and floor are separately molded from fibre reinforced plastics material and in particular the floor panel is formed of a tray shaped platform where the whole of the lower part of the vehicle is molded in one piece including the floor, part of the side wall and all of the structural connections for attachment to the components of the vehicle.

SUMMARY OF THE INVENTION

It is one object of the invention to provide structural shear panel.

According to a first aspect of the invention there is provided a structural shear panel arranged for resting upon and support by a supporting structural frame, the panel comprising:

a first sheet, a second sheet and a core material between the sheets;

each of the first and second sheets being formed of a fiber reinforced material so as to provide strength against tension in both longitudinal and transverse directions;

the core material having a thickness so as to hold the first and second sheets spaced by a distance to provide a resistance of the panel to bending;

and a resin permeated through the sheets;

the panel including a main body which is of generally planar shape such that a series of imaginary parallel planes can be defined through the core with the first sheet on one side of the plane and the second sheet on the other side of the plane;

the main body terminating at its side edges at a portion which lies in a common plane with the main body;

and the panel including at least one second portion which is deformed out of the generally planar shape of the first portion such that the first and second sheets lie wholly on one side of all of the parallel planes of the planar portion;

and wherein the first and second sheets are continuous from the first portion to the second portion and are held spaced by the core material from the first portion into the second portion.

The shear plate of the present invention is arranged so as to avoid the performance problems NABI encountered in revenue service and the economic realities of such a tooling and labour intensive approach which no doubt prompted the abandonment of the project.

The platform of NABI is designed to replace and function as a metal chassis and lower side wall structure. It is the main interface between the vehicle body and the drive train, axles, and even bumper. The structural shear plate of the present arrangement is not designed to replace the metal chassis or to act as the primary interface between these elements and the body. However in some iterations the shear plate may replace the chassis elements that span between the main side rails of the vehicles structure. In other iterations the shear plate may be bonded to components of a metal chassis however with potentially fewer structural elements.

In one primary arrangement, the supporting metal lattice structure or chassis, with which it is designed to co-operate, supports the structural shear plate and is strengthened by it; it is the chassis that interfaces with the above elements in the usual manner. It has been shown in field practice that NABI design is not durable due to inappropriate deployment of the composite sandwich which resulted in high stresses being concentrated at the interface between the composite body and the welded steel elements—for instance, the engine cradle and transmission mounts of the NABI Compo-Bus 40 have been cracking after only two years of revenue service. The shear plate design of the present arrangement conspicuously avoids interface with these components for this reason.

The platform of NABI also forms the lower side wall, even the lower confining surface of the window openings and in particular, the lower gussets of the window openings. The structural shear plate of the present arrangement in one embodiment is designed to act as a reinforcing member of a welded or bolted metal chassis lattice structure. In shaker table testing, the design of the side wall resulted in early failure of the window post connections to the top of the lower side wall.

An objective of the present invention is the designing of a platform suitable for making a bus, using fiber reinforced plastic, as a result of its well known advantages, including but not limited to the advantages of small or reduced weight and no corrosion as well as the fact that preparation activities are not required, even on the outside prior to painting.

The tray platform of the NABI design was intended to function as the chassis and lower side wall of a bus body not to act in synergy with a weight-reduced metal chassis of an otherwise standard bus body. The hardware elements described in the patent application are required to fasten the axles, bumpers, steering gear, drive train assembly, operator's seat securement and the like to the platform. The structural shear plate of the present arrangement does not require this elaborate system of load distribution because it is primarily intended as a chassis reinforcement that provides the user with the following benefits:

Reduction in material content, that is the number of metal components in the chassis can be reduced by 15-25%, thus reducing weight, limiting the effects of corrosion, and reducing labour.

Parts consolidation, that is the wheel housings, operator's platform, fuel tank cover, rear step, and similar elements which are normally separate molded or welded assemblies, can be incorporated into the structural shear plate, thus reducing the number of parts, which in turns reduces procurement, inventory, and part costs weight, assembly labour, and potential sites for leaking.

Adaptability, that is in the NABI design, the location of the exit door and other elements of the platform are fixed by the "negative" tooling and the fact that the tray platform functions as the chassis and side wall structure. The shear plate of the present arrangement places no such limitations on its deployment or the design of the vehicle. It can be any length, the door or wheel housings can be located anywhere the customer may desire, by virtue of the adaptable, "positive and negative" tooling used in the present arrangement.

Finally, the conventional side wall of the vehicle is substantially intact, that is the shear plate of the present arrangement does not replace it, nor does it augment it structurally, it merely seals against it. The shear plate of the present arrangement is a structural shell that fits over the chassis, between the side wall lattice structures and reinforces the chassis.

Based upon the above defined concept, in one preferred construction, the second portion is generally at right angles to the main body. Alternatively the second portion may lie in a generally parallel plane to the main body. Or yet further, the second portion may lie at an angle to the main body and there is provided a third portion generally parallel to the main body so as to form for example a step or plinth.

In a further feature, the second portion may comprise an arch member which is of curved or trapezoidal arched shape. Thus the wheel arches in most buses are now comprised of flat tubes and angles welded together to create a trapezoidal arched form over the axle and wheel.

Where this construction is used as the wheel arch, the portion of the panel may define an arch member which includes an arch wall attached along end edges to the main body and an end wall attached to the arch wall and to the main body.

Preferably the core material is substantial constant thickness at the first and second portions. However the core material may be thinner at the second portion than at the main body where reduced strength is required.

The main body is shaped and arranged to be supported by support rails extending across the main body to the side edges thereof.

This provides a synergy between the existing metal chassis and the shear plate so that a primary function of the shear plate is to reinforce a weight-and-component reduced chassis and eliminate or consolidate parts.

Preferably the core material is formed in a series of panels with a panel located in the second portion being separate from one or more panels in the main body.

According to a second aspect of the invention there is provided a method of manufacturing a structural shear panel as defined above comprising:

providing a base support on which the panel is formed;

the base support having a generally planar body with a generally planar surface;

attaching to the generally planar surface of the base support a raised support portion;

attaching to the generally planar surface of the base support edge members which are upstanding from the surface and define edges of the panel to be formed;

applying over the generally planar portion and the raised support portion to the edge members a first sheet formed of a fiber reinforced material so as to provide strength against tension in both longitudinal and transverse directions such that the shape of the first sheet is defined by surfaces of the generally planar portion and the raised support portion;

applying on to the first sheet a core material;

applying over the core material a second sheet formed of a fiber reinforced material so as to provide strength against tension in both longitudinal and transverse directions such that the shape of the second sheet is defined by surfaces of the core material;

the core material having a thickness so as to hold the first and second sheets spaced by a distance to provide a resistance of the panel to bending;

and permeating a resin through the core and the sheets so as to form an integral structure defined thereby.

Preferably the raised support portion is attached to the base support by an attachment system which allows it to be readily removed and replaced.

Preferably the edge members are attached to the base support by an attachment system which allows them to be readily removed and replaced to change the dimensions of the generally planar surface.

Preferably the structural shear panel is formed in an inverted orientation such that the raised support portion defines a mold surface for a recessed portion of the panel when molded.

Preferably a hole is formed in the planar surface of the base support and a form is installed at the hole to provide a recessed surface and wherein the first and second sheets and the core are applied onto the planar surface and the recessed surface to form an upstanding area or plinth on the structural shear panel when molded.

The shear panels are generally molded upside down, that is the interior or tread surface is face down on the mold. When one is creating a recessed area in the shear plate, a raised element is attached to the "base surface" of the mold; however, when one is creating an upstanding area or plinth on the shear plate, such as a wheel housing, then a hole is cut into and through the "base surface" and a form is installed that creates the wheel housing. Fortunately in low floor buses, the topography of a main deck is substantially flat; however, the topographies of the upper rear deck and vestibule which form separate molded assemblies are replete with recesses and plinths, but their overall smaller size means that these can be accommodated without a lot of effort.

Preferably the base support can be rotated around an axis along the base support so as to change the angle of the planar surface to the horizontal and the resin is permeated by vacuum infusion with the change of angle being used to change the direction of the effect of gravity on the resin to assist in drawing the resin through the panel.

Preferably there is applied on to the first sheet a covering layer to form a facing surface for the panel.

According to a third aspect of the invention there is provided a combination comprising:

a structural shear panel comprising:

a first sheet, a second sheet and a core material between the sheets;

each of the first and second sheets being formed of a fiber reinforced material so as to provide strength against tension in both longitudinal and transverse directions;

the core material having a thickness so as to hold the first and second sheets spaced by a distance to provide a resistance of the panel to bending;

and a resin permeated through the core and the sheets so as to form an integral structure defined thereby;

the panel including a main body which is of generally planar shape such that a series of imaginary parallel planes can be defined through the core with the first sheet on one side of the plane and the second sheet on the other side of the plane;

an accessory for mounting on the panel on one side of the panel;

and an attachment bracket for mounting the accessory on said side of the panel, the attachment bracket comprising:

a bracket plate;

a collar attached to one side of the bracket plate;

the collar projecting through a hole formed in the panel so that the plate bridges the hole and provides a flange surrounding the hole;

the collar having a height such that an end face of the collar is substantially the same thickness as the panel such that with the plate lying flat against one sheet the collar passes through the hole and locates the end face substantially coplanar with the other sheet;

and a mounting plate attached to the accessory and bolted to the bracket plate at locations surrounding the hole such that pressure from the plate and forces on the plates from the accessory are prevented from crushing the panel at the area between the plates.

Preferably the collar is circular in cross-section.

Preferably the hole is formed in shape to match the collar and to closely receive the collar.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
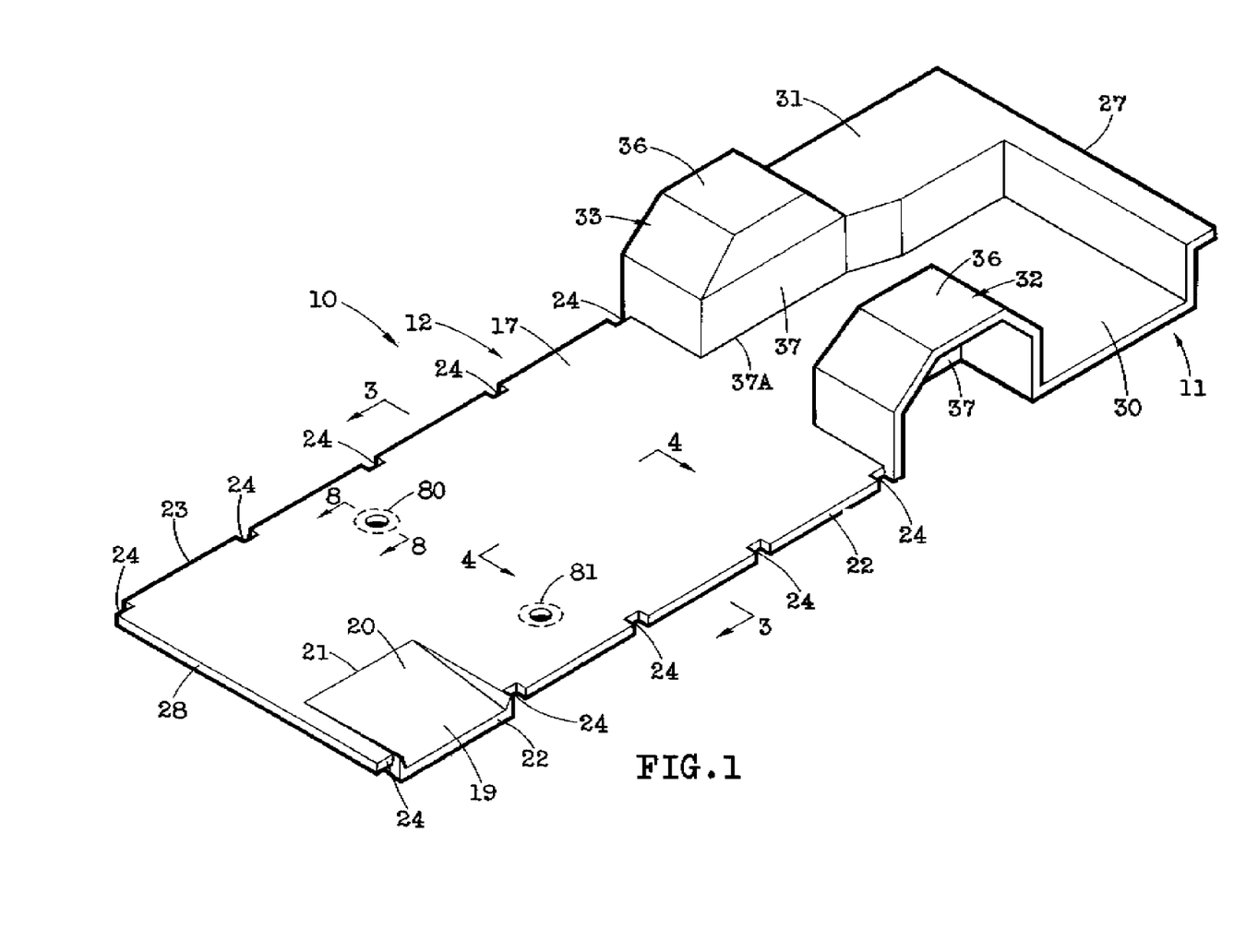
FIG. 1 is an isometric view of the front two sections of a structural shear plate for use in a vehicle and particularly a low floor mass transit vehicle.
Figure 2:
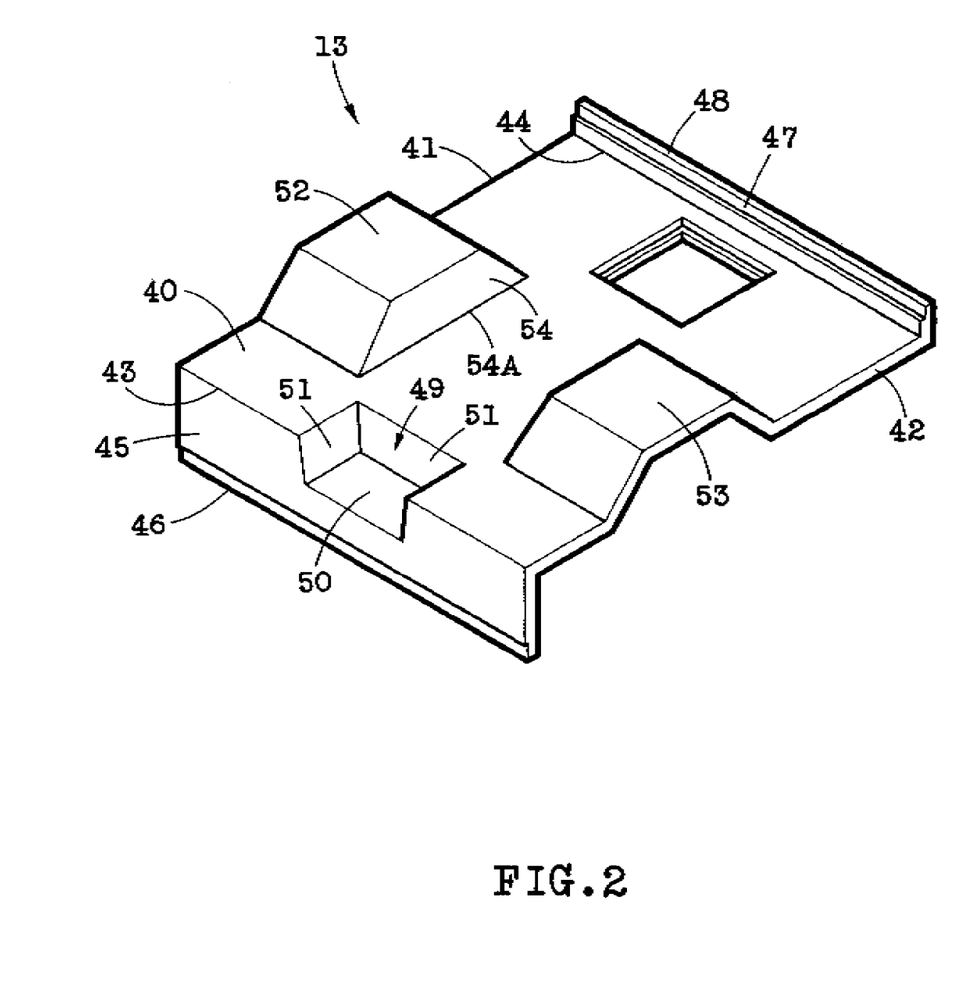
FIG. 2 is an isometric view of a rear section of the structural shear panel.

A structural shear panel for use with a low floor mass transit vehicle is shown in combination in FIGS. 1 and 2 as generally indicated at 10 and includes a front section 11, a main center section 12 and a rear section 13. The structure of low floor buses is well known and includes a front section including front suspension and a front axle forward of which is provided a driver compartment and entry vestibule. The center section of the bus comprises a main floor panel which supports the main area of the seating and extends from a position rearward of the front axle to a position at a rear door. Behind the main panel is provided the rear section where the floor is elevated to pass over the engine and transmission systems.

Figure 3:
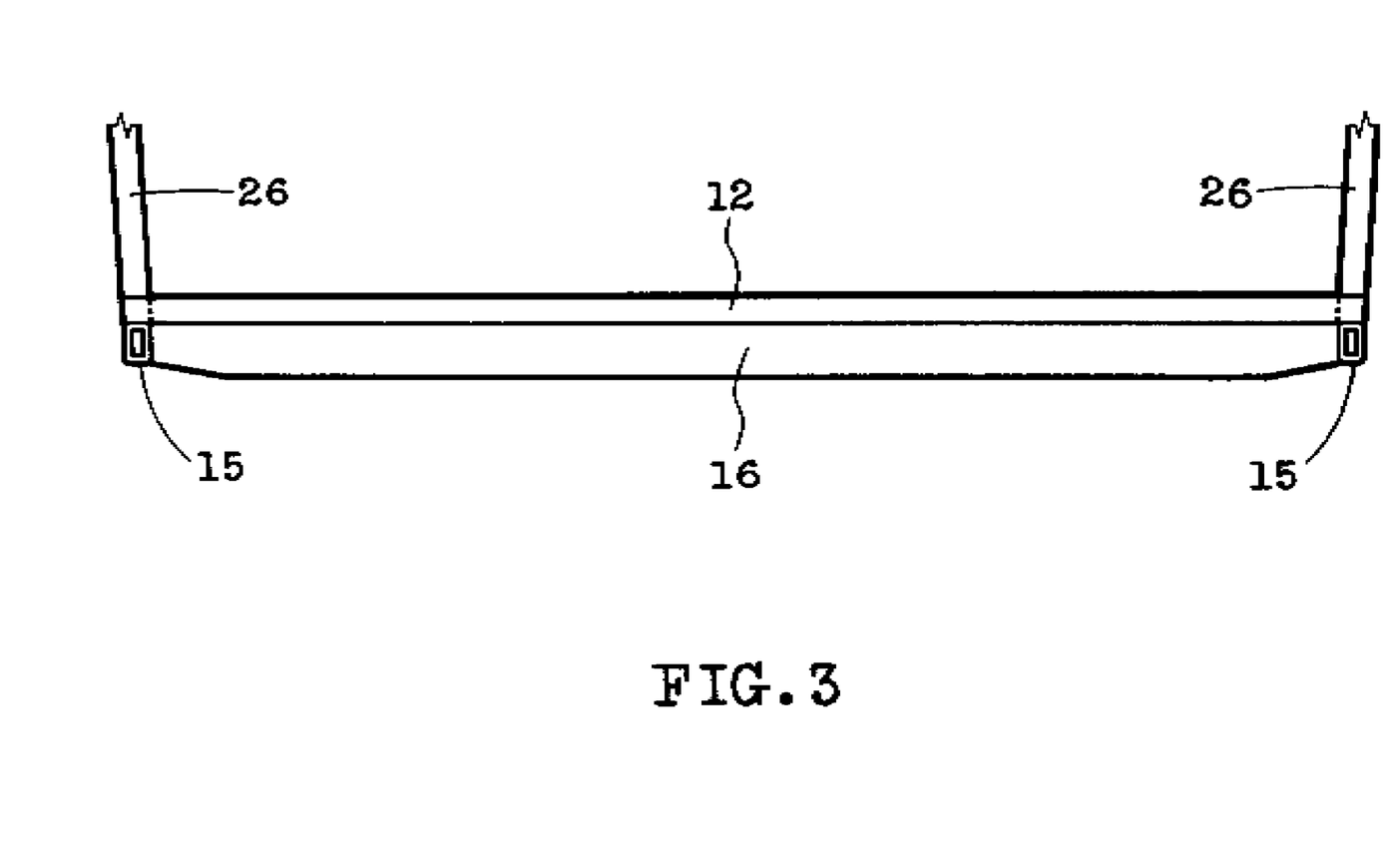
FIG. 3 is a transverse cross sectional view along the lines 3-3 of FIG. 1.
Figure 4:
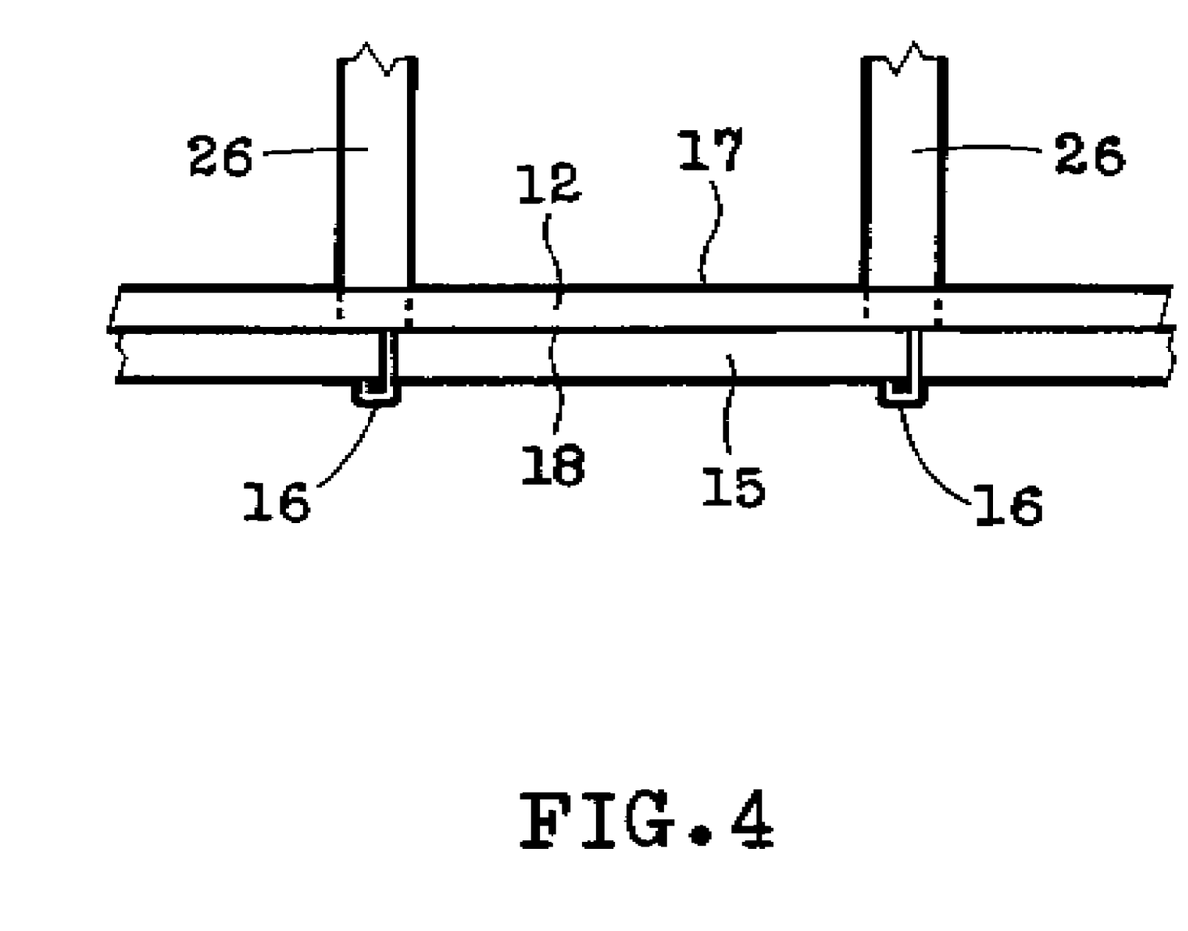
FIG. 4 is a cross sectional view along the lines 4-4 of FIG. 1.

The arrangement shown in FIGS. 1 and 2 provides a shear panel for mounting over the frame of the vehicle so as to provide a floor structure which is fabricated in the three separate pieces 11, 12 and 13. The shear panel is arranged to be mounted upon a frame structure of the vehicle which is generally of a conventional nature. Thus as shown in FIGS. 3 and 4 the frame structure includes side rails 15 of the vehicle together with transverse beams 16 at spaced positions along the length of the vehicle. The panel 12 is applied over the beams 16 and is attached thereto by adhesive so that the frame formed by the side rails 15 and the cross beams 16 is structurally connected to the panel 12 so as to provide a common structural element accommodating structural loads of the vehicle.

The panel 12 is substantially a flat or planar structure having a flat upper surface 17 and a flat lower surface 18 sitting on the beams 16. In most cases the panel 12 does not require raised sections. However the panel 12 includes a rear floor ramp 19 which has a top surface 20 inclined from an edge 21 downwardly and outwardly to form an outer edge 22 at the side edge of the panel where the edge 22 is depressed or recessed relative to the upper surface 17.

The panel 13 includes side edges 22 and 23 each of which includes recessed rectangular notches 24 at spaced positions along the length of the side edge. These notches are arranged to receive upstanding posts of the frame as shown in FIG. 3 at 26. Thus the panel extends to a position at the outer edge of the rails 15 and has the recesses 24 arranged so that the posts of the frame which are attached to the rails 15 stand upwardly within the area of the notch 24 to form the side walls of the vehicle.

The panel 12 is flat over its main body so that the upper surface 17 is planar with that surface extending to the side edges 22 and 23 and also extending between the front edge 27 and rear edge 28. Thus the panel remains in a common plane with the main body at the side edges so that the bottom surface can rest directly on the planar surfaces of the frame and the top surface 17 can provide a flat floor surface on which the occupants can stand and walk.

The front section 11 includes a main body portion 30 which forms a flat floor surface which in the finished structure is coplanar with the surface 17. However in addition the front section 11 also includes raised portions 31 and wheel arches 32 and 33. In addition the front section 11 includes a recessed section (not visible in the drawings) at a front door providing a ramp arrangement. It will be appreciated therefore that in relation to the flat main floor 30, there is provided a recessed section at the front door and the sections 31, 32 and 33 are elevated.

The wheel arches 32 and 33 each provide an arched wall 36 and an end wall 37. The arches are formed not as a smooth curved arch but as three or more panels, each integrally connected to the next, which are flat with two of the panels being inclined upwardly and inwardly and a top panel being generally horizontal. The bottom edge of the front and rear panels of the arch are integrally formed with the front section 11. The end wall of the arch 32 is connected at its lower edge 37A to the main portion 30 of the front panel 11.

The rear section 13 includes a main portion 40 which again is flat between side edges 41 and 42 and between a front edge 43 and a rear edge 44. Again this portion provides a flat upper surface for providing a floor on which the occupants can stand and also provides a flat under surface which sits on a frame structure similar to the rails and cross beams of the center section.

The rear panel 13 includes a vertical front portion 45 which connects to the main portion 40 at the front edge 43 and extends vertically downwardly therefrom to a bottom edge 46. At the rear is provided an upstanding portion 47 which extends from the rear edge 44 upwardly to a top edge 48. Between the upstanding front portion 45 and the main portion 40 is provided a step generally indicated at 49 which has a flat horizontal step plate 50 and upstanding walls 51 around the step plate. In this way an occupant standing onto the center section can step onto the rear section by stepping on the step plate 50 which is recessed from the surface of the main portion 40 and can step from that plate 50 onto the surface of the main portion 40, stepping over the upstanding walls 51.

The panel 13 further includes wheel arches 52 and 53 which are similar in shape and construction to the previous wheel arches 32 and 33 with the exception that the height of the wheel arches is reduced relative to the main panel portion 40 since the main portion 40 is elevated relative to the portion 30 of the panel 11. Thus the wheel arches are all of a common height to engage over the wheels of the wheel which are of a common diameter and thus only the top portion of the wheel arches intersects the main portion 40 of the panel 13. Again the front and rear edges of the arch wall section are connected to and integral with the portion 40 and also an end wall of the wheel arch member as indicated at 54 is integral with the portion 40 at a bottom edge 54A.

Figure 5:
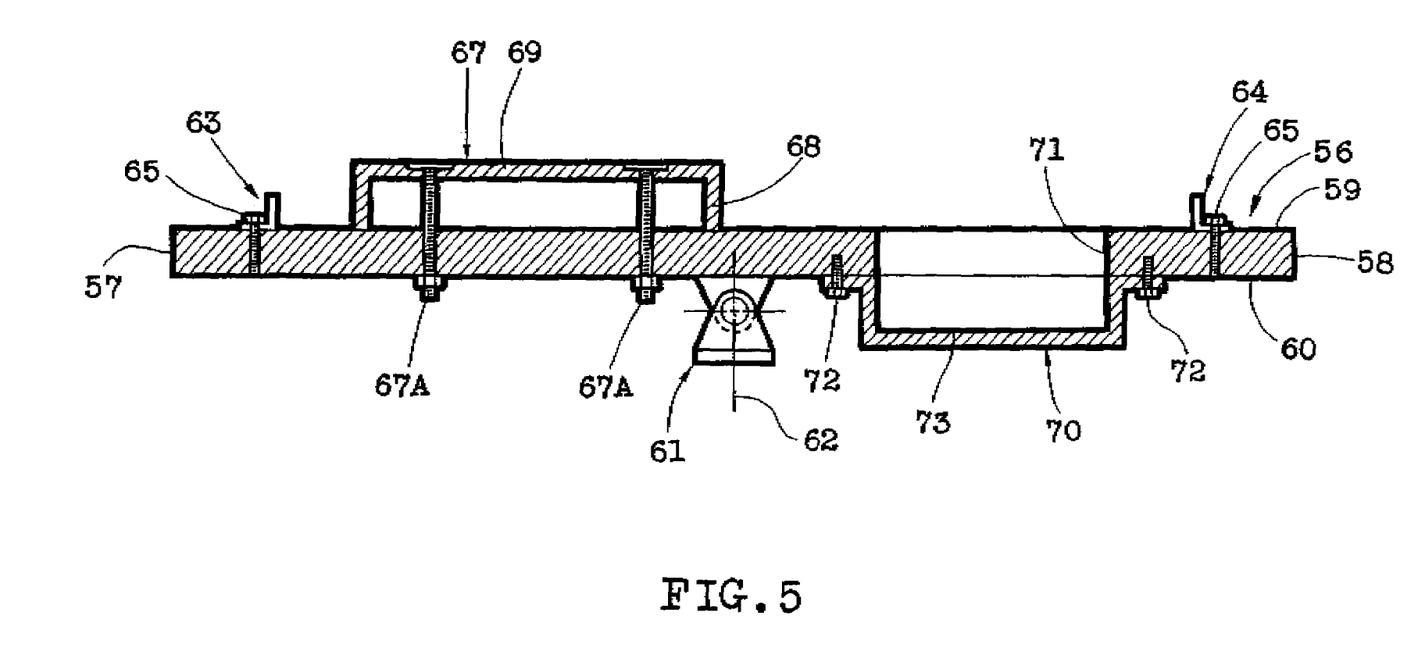
FIG. 5 is a transverse cross sectional view through a mounting plate for use in manufacture of the structural shear panel of FIGS. 1 and 2.
Figure 6:
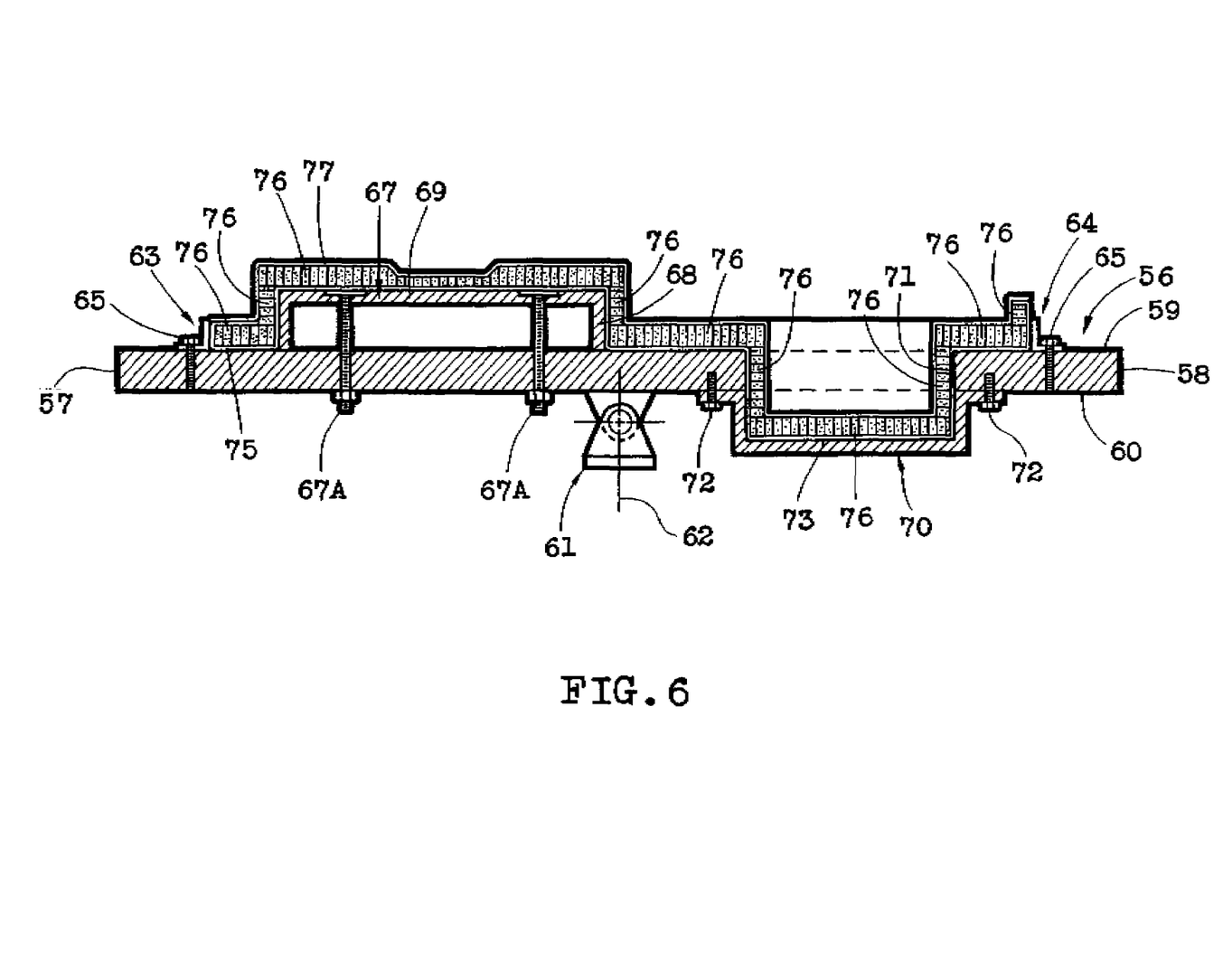
FIG. 6 is a cross sectional view of the mounting plate of FIG. 5 with the components of the panel applied onto the mounting plate.
Figure 7:
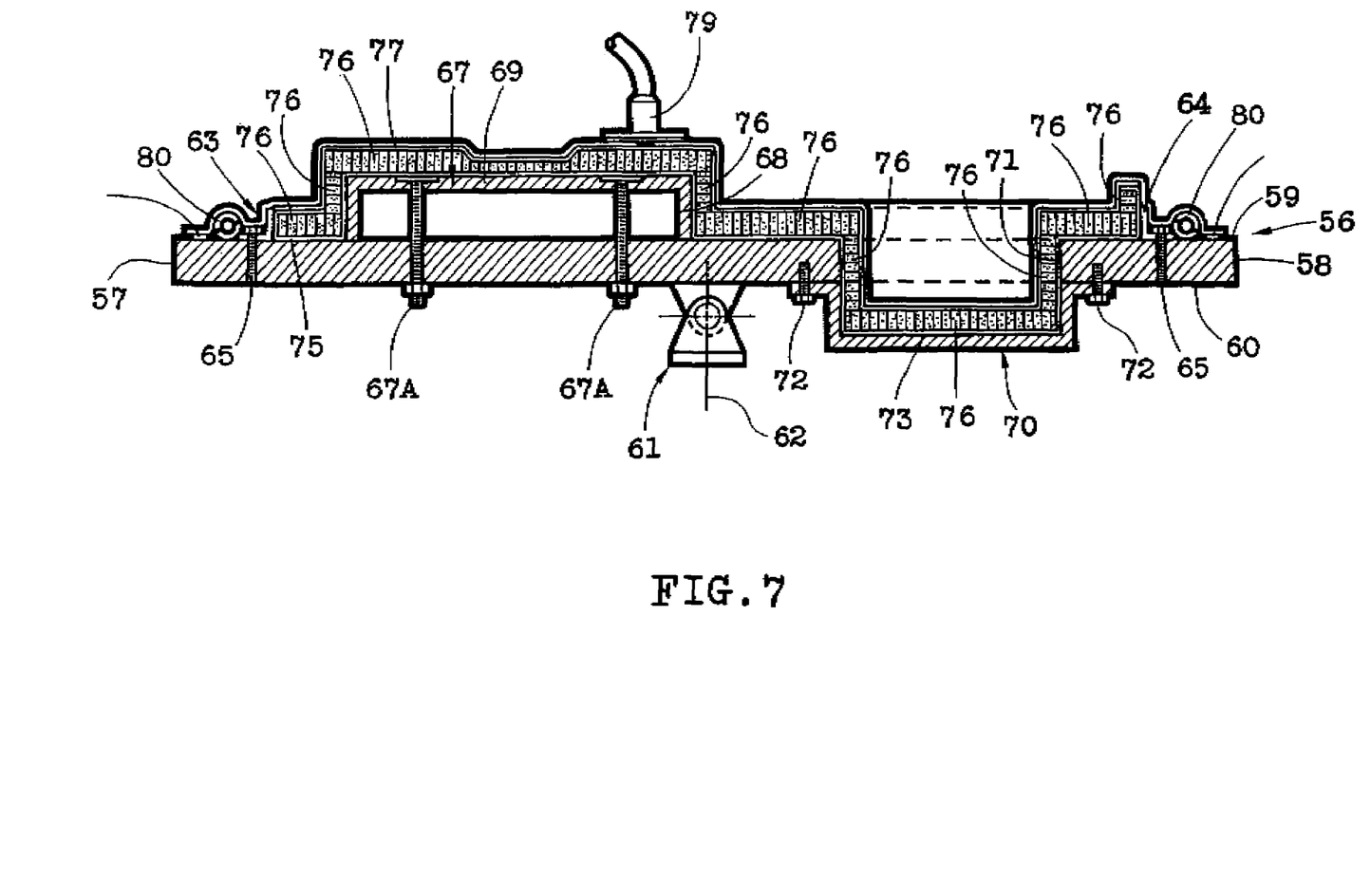
FIG. 7 is a cross sectional view of the mounting plate of FIG. 5 between the panel of FIG. 6 and including a vacuum infusion system for drawing resin into the structure of the panel of FIG. 6.

Turning now to FIGS. 5, 6 and 7 there is shown a method for manufacturing the panels 11, 12 and 13. It will be appreciated that different designs and arrangements of vehicle require different designs and arrangements of the individual panels. The arrangement shown in FIG. 5 shows schematically an arrangement by which the panels can be manufactured using a system which can be modified to accommodate the required shape of the individual panels. Depending upon the numbers of panels to be manufactured, a single mounting plate can be used and adapted for manufacturing the three separate elements, 11, 12 and 13. Alternatively three separate mounting plates can be provided each for manufacturing a separate one of the three separate elements and these three separate mounting plates can be modified to accommodate different designs of the three separate elements as required.

Schematically as shown in FIG. 5 there is provided therefore a mounting plate generally indicated at 56 which is in the form of a large rectangular plate member having side edges 57 and 58. The plate has an upper surface 59 and a bottom surface 60. The plate is mounted on a support schematically indicated at 61 which is arranged a center line 62 of the mounting plate allowing the mounting plate to rotate around an axis along the center line so as to change the orientation of the mounting plate from the horizontal orientation as shown to approximately vertical orientation on either side of the horizontal.

This rotation of the mounting plate is used for two separate purposes in that firstly it can turn the mounting plate to face an operator so that the operator can apply the components to the mounting plate while the mounting plate is standing substantially vertically or is inclined toward the operator thus avoiding the necessity for the operator climbing onto the mounting plate. Secondly the rotation of the mounting plate from horizontal to vertical changes the direction of the force of gravity on the components carried on the mounting plate. This rotation can be used to use gravity to cause resin to run across the plate toward the elements that are temporarily at the bottom. Thus the side edge 59 can be located at the bottom causing resin toward that side edge. Rotation so that the side edge 58 is at the bottom causes resin to run toward that side edge. In this way the resin can be caused to flow to required locations during the resin infusion stage.

On the mounting plate 56 is provided a series of edge location members 63 and 64 which defines respectively side edges of the panel to be formed. Similar edge members are provided at the front and rear edges of the panel. These edge defining members are bolted or otherwise attached to the base plate 56 in a way which allows them to be moved and relocated so as to change the dimensions of the panel to be formed. In the embodiment shown the edge members are shown as simple angle members with a bottom flange lying flat on the top surface 59 and bolted thereto by fasteners 65. However other more complicated mounting arrangements can be provided which temporarily or removably attach the edge defining members to the plate but at the same time provide a seal of the edge member relative to the plate for the resin infusion process using vacuum. The selected edge defining members provide a flange which is upstanding from the plate and defines an intended thickness of the panel.

On the plate is also provided a raised form member generally indicated at 67. This form member has side walls 68 and a top wall 69. In the embodiment shown the side wall 68 stands at right angles to the top surface 59 and the top surface 69 is generally parallel to the surface 59. However it will be appreciated that these angles are not necessarily selected and raised mounting form 67 can be shaped in any required shape to provide a required recess section on the finished panel. The raised form 67 is bolted by bolts 67A to the plate. The attachment again is of a nature which allows the raised form to be moved or removed from the plate. Different raised forms of different shapes can be attached as required at different locations on the plate to provide the required shaping of the panel when finished. The attachment arrangement is selected so that it does not provide any interference with the surface of the plate and the surface of the raised form since it will be appreciated that the top floor surface of the finished panel is defined by the shaping of the exposed top surface of the plate member and thus the plate member should not include any components which interfere with or detract from the smooth and attractive nature of the surface so formed.

In addition to the raised form 67, recessed surfaces can be formed by providing a recessed form member 70 which is located at a hole 71 in the plate 56. Thus the recessed form 70 is bolted by fasteners 72 to the underside of the plate so as to provide an upper surface 73 which cooperates with the top surface 57 of the plate to form a recessed element in the panel when formed so that when the panel is inverted the recessed form 70 defines a raised element on the panel.

Thus it will be appreciated that in one example, the step 50 can be formed on the panel 13 using the raised form 67 and the wheel arches 52 and 53 can be formed on the panel by using the recessed form 70. Other raised and recessed components of the panel as required by a particular design can be manufacturing using selected different shapes and arrangements of the raised forms and the recessed forms together with suitable shaping of the holes 71 in the plate.

With the plate thus formed to the required shape to form a particular panel, the panel is formed on the plate. The panel is formed by providing a first sheet 75 of a fiber reinforced material which is formed with fiber reinforcement in both longitudinal and transverse directions. Sheet is laid over the surface 59 and over the surfaces of the raised and recessed forms up to the edge defining member 63 and 64 where the sheet is folded so that it projects upwardly along the inside surface of that member. Thus the sheet closely follows the surface of the mold to provide the required shape of what will become the top surface of the panel when formed.

With the sheet 75 in place, a series of core members is provided as indicated at 76 which are laid over the surfaces in the required positions. These core members are panels of core material which are cut to the required shape and laid in place over the surfaces. The thickness of the panels is selected to provide a required thickness of the panel when formed. Thus in some cases the panels at certain areas are thinner than others of the structure. In particular the vertical surfaces may be thinner than the horizontal surfaces. In most cases the thickness is constant over the area of the applied panel piece. In other cases the panel pieces may be machined so that their thickness is reduced at certain locations. In this way the panel pieces are assembled to form a core structure which extends through the whole area of the panel to be formed and follows the shape of the surface to be formed defined by the surface 59 and the surfaces of the raised and recessed forms.

With the panel pieces in place, a top sheet 77 is applied over the whole structure. The top and bottom sheets are preferably formed as a single sheet of material but if the size is such that a single sheet is impractical, separate individual sheets can be laid and overlapped and connected to provide the structural strength equivalent of the single sheet.

With the sheets in place containing the core material therebetween, resin is infused through the complete structure. This infusion is effected using conventional techniques known to persons skilled in this art and utilize a resin infusion container or bag which wraps over the whole structure so that the vacuum can be applied at various locations across the bag. The bag is shown at FIG. 7 and indicated at 78. Resin is injected at certain locations within the structure as indicated at 79. The vacuum is drawn at a vacuum extraction point 80. Curing extraction, the orientation of the materials on the support plate can be changed to utilize gravity to assist the resin to flow through the panel from the injection ports 79 to the extraction ports 80 to ensure that the resin is properly infused through the whole structure to integrate the structure as required to provide the necessary structural strength.

Figure 8:
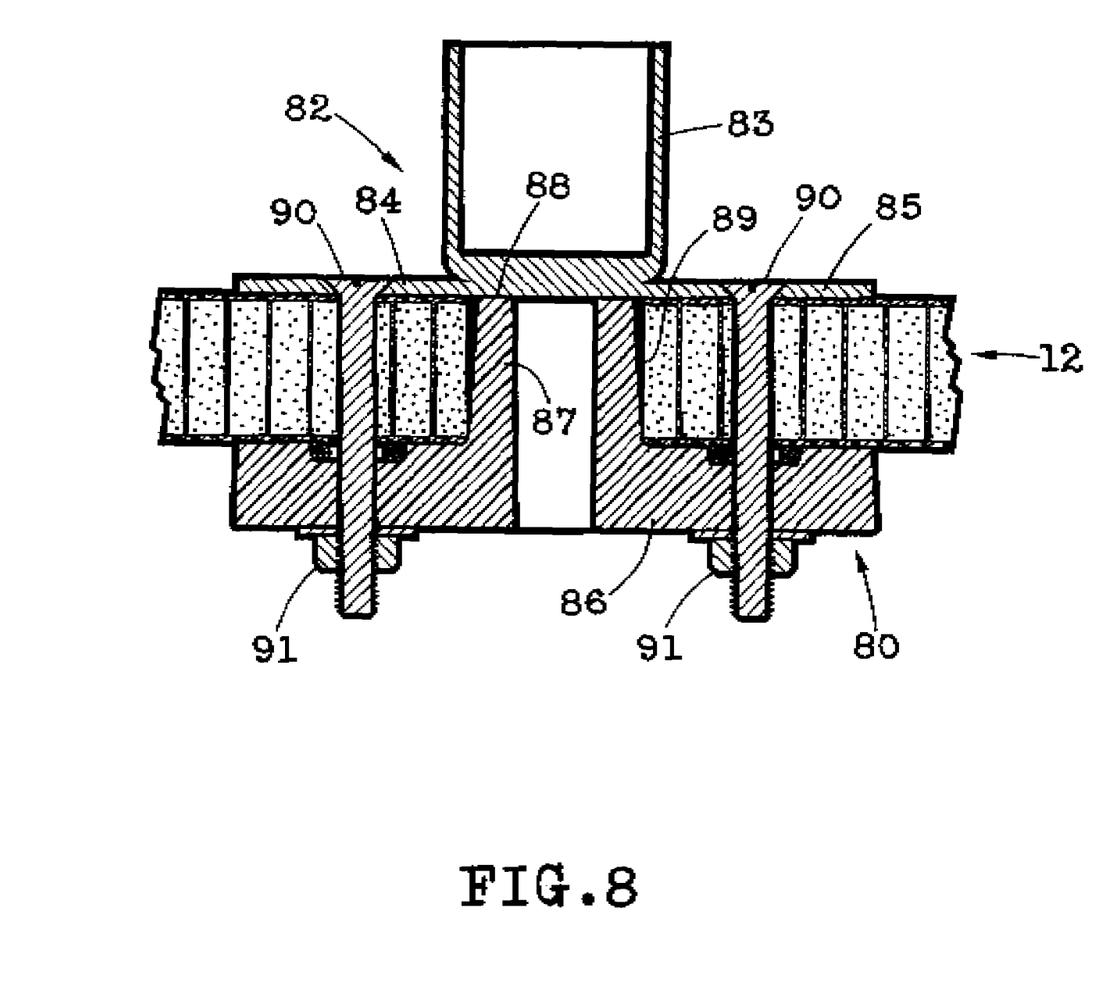
FIG. 8 is a cross sectional view along the lines 8-8 of FIG. 1 showing the mounting of an accessory onto a suitable location on the panel.

In FIG. 1 is shown a pair of mounting brackets 80 and 81 for attachment of accessories to the panel. The construction of the bracket and associated accessory is shown in FIG. 8 including the bracket 80 on the underside of the panel 12 and a base portion of the accessory 82 attached to the upper surface of the panel 12. The accessory 82 comprises a post 83 which is attached at its lower end to a plate 84 which has side edges 85 surrounding the base of the post to form a flange around the post. The bracket 80 comprises a base plate 86 and an upstanding collar 87. Preferably the plate 86 and the collar 87 are of circular cross section. The collar has an upper edge 88 forming the end of the cylinder defining the collar. The base of the cylinder is formed integrally with the plate 86 as a molding of a suitable plastics material.

In order to assemble the accessory to the bracket, a hole 89 is cut in the panel 12 with the diameter of the whole matching the outside surface of the collar 87. This allows the plate 86 to be pressed against the under side of the panel 12 by sliding the collar 87 into the hole until the upper edge 88 of the collar is slightly proud of or directly at the upper surface of the panel 12. The plate 84 is then clamped to the plate 86 by bolts 90 which extend through suitable holes in the plates and are fastened to the base plate 86 by nuts 91. Thus the bottom plate 86 is in contact with the bottom surface of the panel in an area surrounding the sleeve so that the flange portion of the plate surrounding the collar provides an abutment surface transferring loads to the bottom surface of the panel 12. Similarly the top plate 88 transfers loads to the top surface of the panel and also transports loads through the sleeve 87 to the base plate. The height of the sleeve is selected so that the plates engage the top and bottom surfaces of the panel without compressing the core material.

The above described construction provides at least four primary benefits:

Light weight, where a ¾" thick sandwich floor weighs just 1.50 lbs/sq. ft. relative to a competitive product which is Greenwood's XL Bus Paneling which weighs 2 lbs/sq ft. Over a 44' bus, this translates to a minimum weight savings of 283 lbs over ACQ plywood for a 231 sq. ft, deck assembly (40' bus upper deck, main decks vestibule, and driver's platform). This does not include the screws and Morbond joint filler.

Superior performance to plywood in that the product of the present arrangement will never absorb water, rot, delaminate, split, swell, soften, or crack, over the life of the vehicle. There are no organic materials, such as balsa wood, to rot in the structure.

Consolidation of parts in that the configurable tooling facilitates the consolidation of parts, such as the rear step, or wheel housings, into the flooring matrix, eliminating separate parts, joints, fluid and gas leaks, and the assembly costs associated with multiple part assemblies. Moreover, a unitized flooring package of the present arrangement adds to the structural integrity of the chassis. The vestibule, dashboard, and operator's platform can be combined into one, drop-in unit that has its own structural integrity, and is self insulating.

Easy installation, unlike plywood and all other composite floors, the floors of the present arrangement are supplied to the vehicle production line molded in one piece, with factory-sealed edges, ready to install. No joints to fill, no jig saw puzzle of boards to assemble and screw down to the structure. Each deck is self supporting during installation and can be lifted out of its steel shipping container and onto the chassis using suction cups, without fear of cracking, bending, or delaminating. Typical labor savings for floor assembly are in the range of 42 man hours.

The panel of the present arrangement can be supplied complete with the floor covering factory installed so that there is no more cutting and gluing and no more harmful VOCs.

The variable geometry molds can be configured to match almost any floor design. In most cases, the upper and main decks as well as the entrance area (commonly referred to as the vestibule) can be vacuum molded in a master form in one sequence, amortizing set-up costs and maximizing efficiency. The edges are factory sealed as part of the molding process. The panel can provide floors with sloped areas at the entrance and exit doors.

The floating backer plates of the present arrangement eliminate the need for inserts molded in to the panel to resist compression of the honeycomb core around accessories such as stanchion cups or pull-out forces acting on wheel chair rig downs and seat supports. The plates can be applied at any location after installation of the panel allowing customer's requirements to be met for stanchion, seat, and wheel chair placement with one standard floor design. The backer plates can be installed in the factory or in the field. The injection molded backer plates are formed of tough, glass reinforced polypropylene that is also environmentally responsible, comprised of 100% recycled automotive bumper beams.

While there are many benefits using the composite flooring of the present arrangement as a straight replacement for plywood flooring, its often overlooked attributes as a structural component could prove even more beneficial, especially where weight and cost savings are important. Specifically, in thicknesses over 1.0", the composite sandwich floor interacts synergistically with the chassis when bonded directly to it, increasing the stiffness of the entire assembly. Thus, using the structural floor assembly, the spans or spaces between the transverse bulkheads can be substantially increased and the number of bulkheads thus reduced. The longitudinal stringers are strictly for alignment and stabilization of the bulkheads and absorption of the thrust loads placed on the chassis by the movement of the vehicle. The estimated weight for a 133 sq. ft main deck, including the mild steel transverse bulkheads and longitudinal stringers shown in the drawing would be 617 lbs. This can be significantly reduced.

Unlike other composite flooring comprised of individual panels bonded together, the structural sandwich floor of the present arrangement is a unified structure. The top and bottom skins encapsulating the core are of a single piece, that is, the reinforcing glass matrix extends the entire length and width of the floor without interruption. This means that the bending stresses placed on the sandwich are distributed over the entire floor, rather than between the supporting structural members.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:
1. A vehicle body comprising:
a vehicle frame defined by metal structural components including two side rails each located at a respective upstanding side wall of the vehicle frame;
a structural shear floor panel structurally connected to the metal structural components resting upon and supported by the metal structural components so as to provide a common structural element therewith accommodating structural loads;
the panel comprising an upper sheet, a lower sheet and a core material between the upper and lower sheets;
each of the upper and lower sheets being formed of a fiber reinforced material so as to provide strength against tension in both longitudinal and transverse directions;
the core material having a thickness so as to hold the upper and lower sheets spaced by a distance to provide a resistance of the panel to bending;
and a resin permeated through the upper and lower sheets and forming with the core material an integral structure;
the floor panel including a floor portion which is of generally planar shape;
wherein the floor portion terminates at side edges of the floor portion which side edges lie in a common plane with the floor portion and is bonded by an adhesive to and supported by a respective one of the side rails of the metal structural components of the vehicle body;
wherein the floor panel includes at least one second portion which is deformed out of the generally planar shape of the floor portion so as to:

raise to a height so that a part of the second portion, which part is defined by the upper sheet, lower sheet and core material, is wholly above a plane of the upper sheet of the floor portion;

or fall to a depth so that a part of the second portion, which part is defined by the upper sheet, lower sheet and core material, is wholly below a plane of the lower sheet of the floor portion;

and wherein the upper and lower sheets are continuous from the floor portion into the second portion and are held spaced by the core material from the floor portion into the second portion;

the second portion extending at least partly across the floor portion;

and the floor panel including the second portion being arranged to co-operate with the metal components to provide a structural member by which transverse metal components connecting the side rails are eliminated or reduced.

2. The vehicle body according to claim 1 wherein the metal structural components include at least one transverse rail under the floor panel to which the floor panel is bonded by an adhesive and which provides support for the floor panel.

3. The vehicle body according to claim 2 wherein the at least one transverse rail is attached to the side rails.

4. The vehicle body according to claim 1 wherein the second portion includes at least a part which is generally at right angles to the floor portion.

5. The vehicle body according to claim 1 wherein the second portion includes at least a part which lies in a generally parallel plane to the floor portion.

6. The vehicle body according to claim 1 wherein the second portion defines a step which includes a first step portion which lies at an angle to the floor portion and a second step portion generally parallel to the floor portion.

7. The vehicle body according to claim 1 wherein the second portion comprises a wheel arch member.

8. The vehicle body according to claim 7 wherein the wheel arch member includes an arch wall attached along first and second spaced end edges to the floor portion and a generally upstanding end wall attached at its upper end to the arch wall along one side edge of the arch wall and at its lower end to the floor portion.

9. The vehicle body according to claim 1 wherein the second portion comprises a raised element on the floor portion.

* * * * *